(12) United States Patent
Williams et al.

(10) Patent No.: US 10,279,743 B1
(45) Date of Patent: May 7, 2019

(54) CAMERA WITH WIRELESS MONITOR

(71) Applicants: C. Ray Williams, Galion, OH (US); Grace L. Webber, Galion, OH (US)

(72) Inventors: C. Ray Williams, Galion, OH (US); Grace L. Webber, Galion, OH (US)

( * ) Notice: Subject to any disclaimer, the term of this patent is extended or adjusted under 35 U.S.C. 154(b) by 714 days.

(21) Appl. No.: 14/274,029

(22) Filed: May 9, 2014

Related U.S. Application Data (60) Provisional application No. 61/821,417, filed on May 9, 2013.

(51) Int. Cl.
- *B60R 1/00* (2006.01)
- *H04N 7/18* (2006.01)
- *B60R 11/04* (2006.01)
- *B60R 11/00* (2006.01)

(52) U.S. Cl.
CPC .............. *B60R 1/008* (2013.01); *B60R 11/04* (2013.01); *H04N 7/185* (2013.01); *B60R 2011/0091* (2013.01); *B60R 2300/406* (2013.01); *B60R 2300/8013* (2013.01)

(58) Field of Classification Search
CPC . B60R 1/008; B60R 11/04; B60R 2011/0091; B60R 2300/406; B60R 2300/8013; H04N 7/185
USPC ......................................................... 348/158
See application file for complete search history.

(56) References Cited

U.S. PATENT DOCUMENTS

| | | | |
|---|---|---|---|
| 4,386,724 A * | 6/1983 | Kotler | A45C 13/26 224/255 |
| 4,949,186 A | 8/1990 | Peterson | |
| 5,111,289 A | 5/1992 | Lucas et al. | |
| 6,211,907 B1 | 4/2001 | Scaman et al. | |
| 7,051,356 B2 | 5/2006 | Weinstein | |
| 7,954,129 B2 | 5/2011 | Renkis | |
| 8,511,626 B1 * | 8/2013 | Trinh | B60K 35/00 248/187.1 |
| 2004/0008255 A1 | 1/2004 | Lewellen | |
| 2007/0019077 A1 | 1/2007 | Park | |
| 2009/0054787 A1 * | 2/2009 | Adler | G09B 23/30 600/476 |
| 2009/0195655 A1 | 8/2009 | Pandey | |
| 2011/0150247 A1 * | 6/2011 | Oliveras | G06F 1/1688 381/304 |
| 2014/0049636 A1 * | 2/2014 | O'Donnell | G08C 17/02 348/143 |

OTHER PUBLICATIONS https://web.archive.org/web/20130110132351/http://www.everymac.com/systems/apple/iphone/specs/apple-iphone-specs.html.*

* cited by examiner

*Primary Examiner* — Mehrdad Dastouri
*Assistant Examiner* — Joseph W Becker
(74) *Attorney, Agent, or Firm* — Cramer Patent & Design, PLLC; Aaron R. Cramer (57) ABSTRACT

A wireless portable video monitoring system comprises at least one (1) portable color video camera with audio content, further having a mounting means. Each camera is provided with an integral transmitter capable of broadcasting the acquired data using a radio signal. The system further comprises a portable video monitor having a display capable of split screen operation. The monitor is also provided with a mounting means. Each camera wirelessly transmits its signals to the monitor. The system is particularly useful for viewing occupants in a rear area of a vehicle by a motorist.

1 Claim, 6 Drawing Sheets

CAMERA WITH WIRELESS MONITOR

RELATED APPLICATIONS

The present invention was first described in and claims the benefit of U.S. Provisional Application No. 61/821,417, filed May 9, 2013, the entire disclosures of which are incorporated herein by reference.

FIELD OF THE INVENTION

The present invention relates to an apparatus that enables a person to employ a portable system to monitor a visually and acoustically remote and secluded location.

BACKGROUND OF THE INVENTION

Child safety is among the most important issues that concern today's parents. These concerns are heightened in the area of automobile safety. Laws concerning the use of car seats, booster seats, seatbelts, and the like, continue to save lives, and will do so in the future as well. However, regardless of any specific law, or the usage of any specific device, the best safety practice is to be mindful of what a child is doing at any moment. This is a somewhat difficult task when considering the placement of the driver in the front of the vehicle relative to the placement of the child in the rear of the vehicle. Drivers, and even front seat passengers, can be easily distracted by the activity in the rear of a vehicle. While mirrors provide some rearward vision, the observation area is somewhat limited, and may even be more distracting than no mirror at all. These same problems exist in other locations where it is necessary to view a child to confirm their safety such as in a crib, playpen, or in bedroom. Accordingly, there exists a need for a means by which visual observation of an area can be provided to ensure a child's safety to alleviate the concerns as described above. The development of the video camera with wireless monitor fulfills this need.

The invention comprises two (2) main components. The first component is a battery operated portable color video camera with the capability of recording and transmitting video and audio content. The video camera is operated by a rechargeable battery, and is capable of operating for hours without being recharged. The video camera is equipped with a universal mounting mechanism that allows it to be placed virtually anywhere. This mounting mechanism has two (2) versions enabling it to secure the camera to a flat smooth surface or placed around a vehicle headrest. Preferably, the video camera is positioned such that the camera can capture motion pictures of the entire back seat area. The camera is further provided with an integral transmitter capable of broadcasting the video and audio signal for hundreds of feet.

The second component of the invention is a portable video monitor. The screen is small enough to not pose as a distraction to a driver, but still large enough to allow for split-screen operation for viewing video footage from multiple separate cameras. The battery powered monitor is provided with a universal mounting clamp and suction cup for mounting to virtually any flat smooth surface. The portable video monitor is used to receive and display visual and audio data transmitted from the video camera so that persons in the front of the vehicle can observe the occupants in the rear of the vehicle without having to physically turn around.

Prior art in this field consists of closed-circuit video monitoring systems that provide live feeds but that are not portable and require complex installation. Other prior art video recoding systems that are more portable do not provide live feed video and audio from a recorder to a remotely located display.

It is an objective of the present invention to provide a surveillance system to observe live occurrences of an isolated, or otherwise remote, location via a wireless display and camera.

It is a further objective of the present invention to enable high portability and positioning of the system, as well as universal mounting of the various parts, so that it may be used virtually anywhere.

It is a further objective of the present invention to provide a surveillance system capable of displaying multiple images simultaneously from multiple cameras.

It is a further objective of the present invention to enable use of existing mobile electronic devices as the wireless display device, if it is desired to do so.

SUMMARY OF THE INVENTION

The system comprises at least one (1) video camera and a wireless monitor to display visual and audio data wirelessly transmitted from the video camera. Each video camera is provided with a securement mechanism that enables a user to mount them virtually anywhere. In a first embodiment the securement mechanism is an adjustable strap to enable securement to a headrest portion of a vehicle or other similarly shaped object, whereas in a second embodiment the securement mechanism is an adjustable suction cup mechanism to enable securement to a smooth flat surface such as a window. The wireless monitor is also provided with similar securement mechanisms. These securement mechanisms also enable orbital motioning of the wireless monitors to which they are attached for added utility. The system is configured for a user to place the video camera in an area isolated from, or within obstructed view of, a user so that the wireless monitor may display the imagery and transmit audio from that isolated area enabling a user to see and hear the occurrences of the isolated area.

Each camera is configured to record and convert motion picture and audio into a video/audio feed and transmit it to a radio receiver portion of the wireless monitor. Each video camera is equipped with a rechargeable battery and an electrical power supply receptacle to receive electrical power for the battery. The wireless monitor is configured to receive the video/audio feed from each camera, compile it, and display it on a display screen and/or through a speaker. This wireless monitor is further enabled to display imagery on split screens. The wireless monitor is also equipped with an electrical power supply receptacle and a rechargeable battery.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

DESCRIPTIVE KEY 10 video camera with wireless monitor
20 video camera
22 radio signal
30a first attachment mechanism
30b second attachment mechanism
32 fastener
33a first camera bracket
33b second camera bracket
34a first camera housing
34b second camera housing
36 suction cup
40 wireless monitor
50 third attachment mechanism
52 monitor housing
54 monitor bracket
56 pivot assembly
60 push button
70 speaker
80 display screen
90 lens
100 imaging sensor
110 camera converter
120 radio transmitter
130 first electrical supply receptacle
133 power switch
135 first battery
137 power source
140 radio receiver
150 central processor
160 second electrical power supply receptacle
165 second battery
200 vehicle
205 windshield

DETAILED DESCRIPTION OF THE PREFERRED EMBODIMENT

The best mode for carrying out the invention is presented in terms of its preferred embodiment, herein depicted within FIGS. 1 through 3c. However, the invention is not limited to the described embodiments, and a person skilled in the art will appreciate that many other embodiments of the invention are possible without deviating from the basic concept of the invention and that any such work around will also fall under the scope of this invention. It is envisioned that other styles and configurations of the present invention can be easily incorporated into the teachings of the present invention, and only certain configurations will be shown and described for purposes of clarity and disclosure and not by way of limitation of scope.

The terms "a" and "an" herein do not denote a limitation of quantity, but rather denote the presence of at least one of the referenced items.

The present invention describes a system having at last one (1) video camera and wireless monitor (herein described as the "system") 10, which provides a means to visually and acoustically monitor a remote, or otherwise obstructed, location by having a video camera 20 transmit radio signals 22 to a wireless monitor 40.

Figure 1:
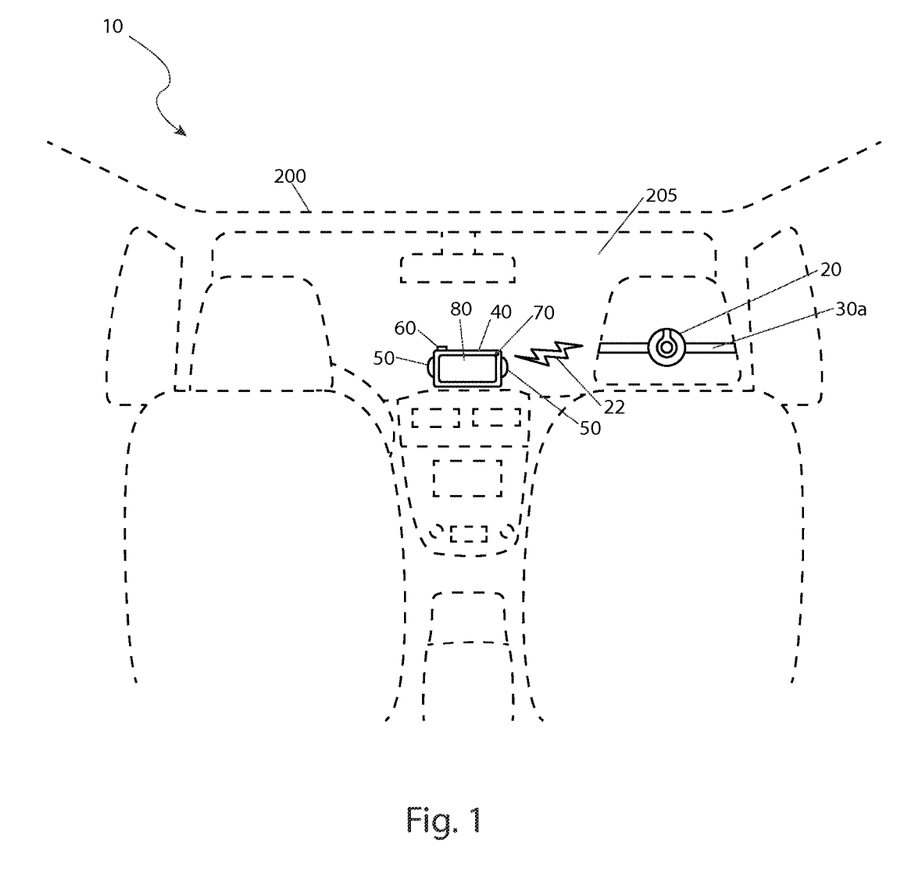
FIG. 1 is an environmental view of a video camera with wireless monitor 10, according to a preferred embodiment of the present invention.

Referring now to FIG. 1, an environmental view of the system 10, according to the preferred embodiment of the present invention, is disclosed. The system 10 comprises at least one (1) video camera 20 mounted to a headrest portion of a vehicle 200 using an attachment mechanism 30a, and a wireless monitor 40 mounted to a windshield or other structure using another attachment mechanism 50. The system 10 is illustrated here being utilized within a motor vehicle 200; however, it is understood that the system 10 may be taken with a user to be employed at the discretion of the user to monitor and transmit video and audio data for activities in various locations, and as such should not be interpreted as a limiting factor of the system 10. The video camera 20 is placed in an area to be monitored so as to provide a user with a vantage point. The video camera 20 records motion picture and audio data present within the monitored area, and converts the motion picture and audio data into a video-audio feed that is transmitted to a radio receiver portion 140 of the wireless monitor 40 via radio signals 22 using a suitable wireless transmittable format (see FIG. 3).

Figure 2A:
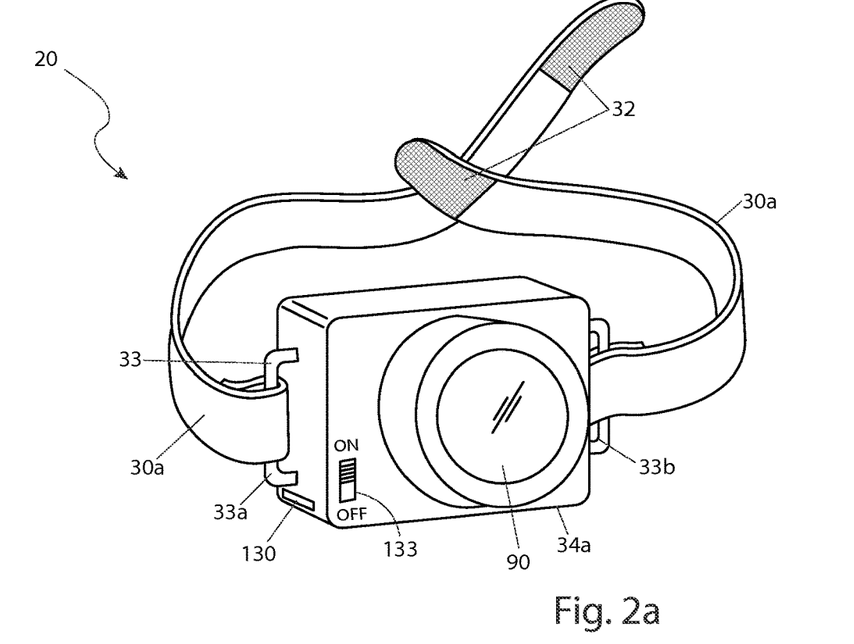
FIG. 2a is a front view of a video camera portion 20 of the video camera with wireless monitor 10, according to a preferred embodiment of the present invention.
Figure 2B:
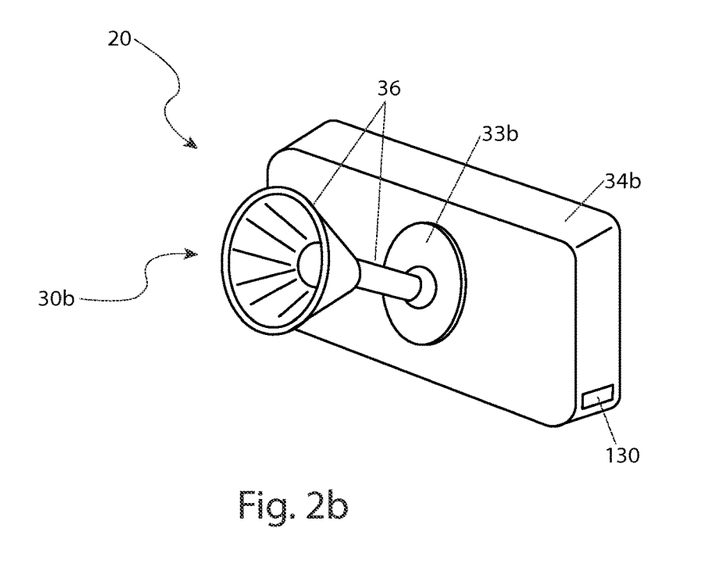
FIG. 2b is a rear view of the video camera 20, according to a preferred embodiment of the present invention.
Figure 2C:
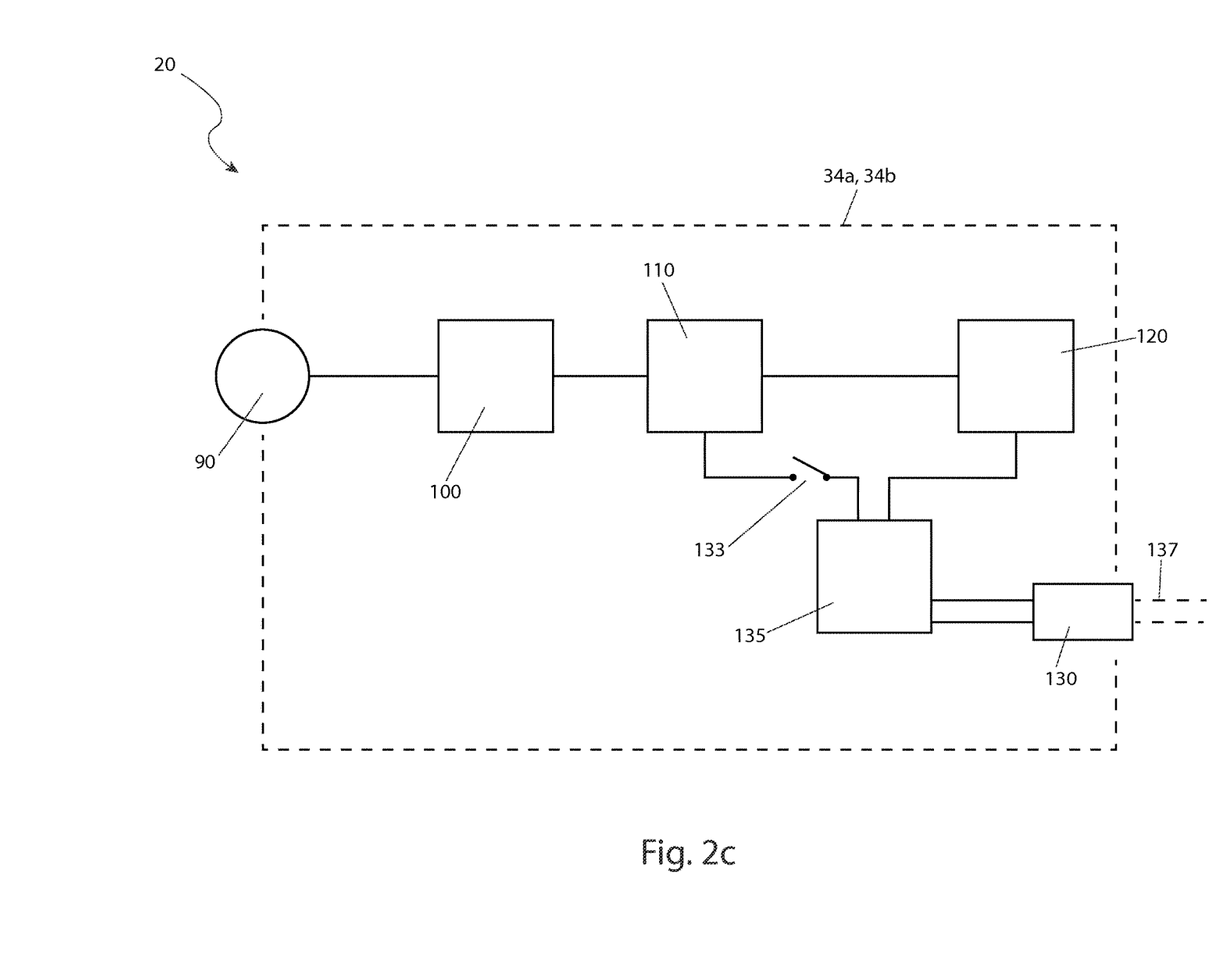
FIG. 2c is a schematic of the video camera 20, according to a preferred embodiment of the present invention.

Referring now to FIGS. 2a, 2b, and 2c, front, rear, and schematic views of the video camera 20, according to a preferred embodiment of the present invention, are disclosed. The video camera 20 includes a first camera bracket 33a, a first camera housing 34a, an optical lens 90, at least one (1) imaging sensor 100, and a camera converter 110, which are utilized to acquisition motion picture and audio data, and covert the acquired data to a wireless transmittable format. However, it is understood that other video technologies may be utilized without deviating from the teachings of the system 10, and as such should not be interpreted as a limiting factor of the system 10. The video camera 20 is provided with an internal radio transmitter 120 to transmit the acquisitioned data to a radio receiver 140 portion of the wireless monitor 40 via radio signals 22 (see FIG. 3).

In a preferred embodiment of the video camera 20, electrical power is supplied via a rechargeable first battery 135 housed within a first camera housing portion 34a of the video camera 20. The video camera 20 is further provided with a first electrical power supply receptacle 130 such as a universal serial bus (USB), capable of conducting electrical power from a remote power source 137 to the rechargeable first battery 135. The video camera 20 also includes a power switch 133 envisioned to be a two-position switching device mounted to a side surface of the video camera 20 which selectively controls the distribution of electrical power from the first battery 135 to the aforementioned internal electrical components. It is understood that the remote power source 137 may include a cigarette lighter socket, a plug-type AC/DC transformer, or the like, based upon available sources and a user's preference.

An embodiment of the video camera 20 is illustrated in FIG. 2a showing a first attachment mechanism 30a which is suitable for attachment of the video camera 20 to a headrest portion of a vehicle 200 or similar structure. The camera 20 is shown here having a first camera housing 34a which provides an attachment means to the first attachment mechanism 30 via integral "U"-shaped first camera bracket portions 33a. The first attachment mechanism 30 is made using a strapping material being sewingly or otherwise affixed to the first bracket portions 33a which are located along opposing side surfaces of the first camera housing 34a. The strap portions of the first attachment mechanism 30a extend outwardly from the video camera 20 in both directions. The first attachment mechanism 30 may be wrapped around various objects and fastened to itself preferably using hook-and-loop fasteners 32, or equivalent means, being sewn thereto, or otherwise affixed to each end portion.

Additionally, the camera 20 may also be configured with a second camera housing 34b as seen in FIG. 2b which provides attachment of the video camera 20 to a smooth surface such as a window, or the like. The second camera housing 34b includes an integral second camera bracket 33b centered along a rear surface, which provides a ball-joint-type connection to a suction cup portion 36, thereby allowing securement and orbital positioning of the camera 20 with respect to the second attachment mechanism 30b.

It is understood that other attachment mechanisms in addition to those described herein, may be utilized for attachment of the video camera 20 to various structures without deviating from the teachings of the system 10, and as such should not be interpreted as a limiting factor of the system 10.

Figure 3A:
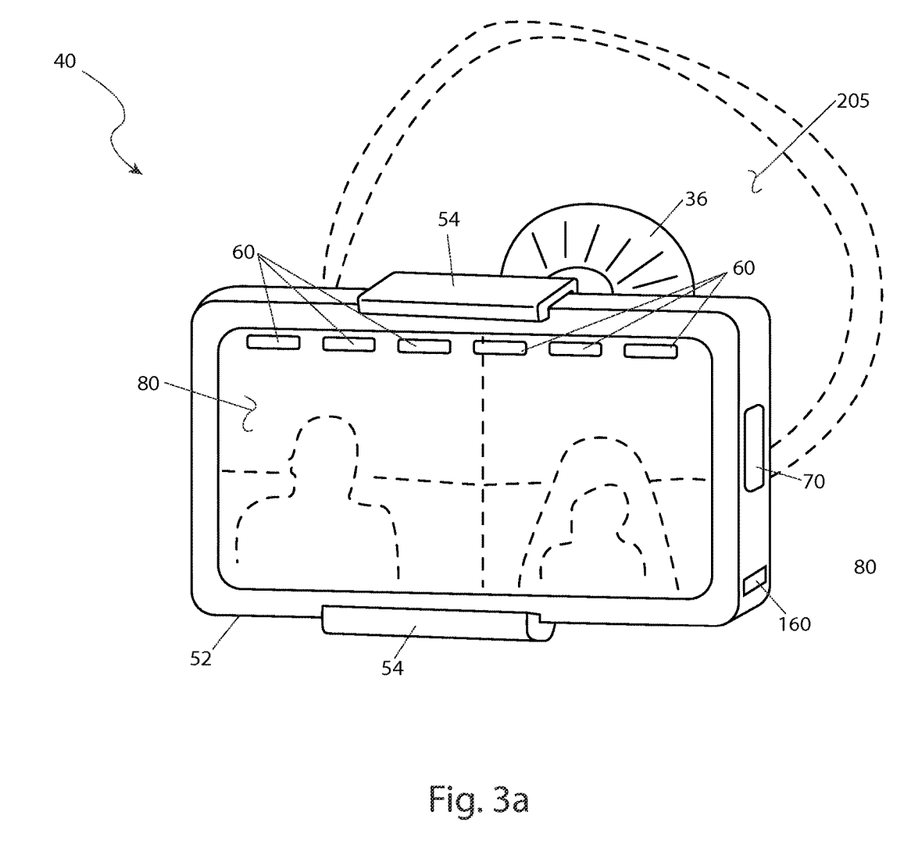
FIG. 3a is a front view of the wireless monitor 40, according to a preferred embodiment of the present invention.
Figure 3B:
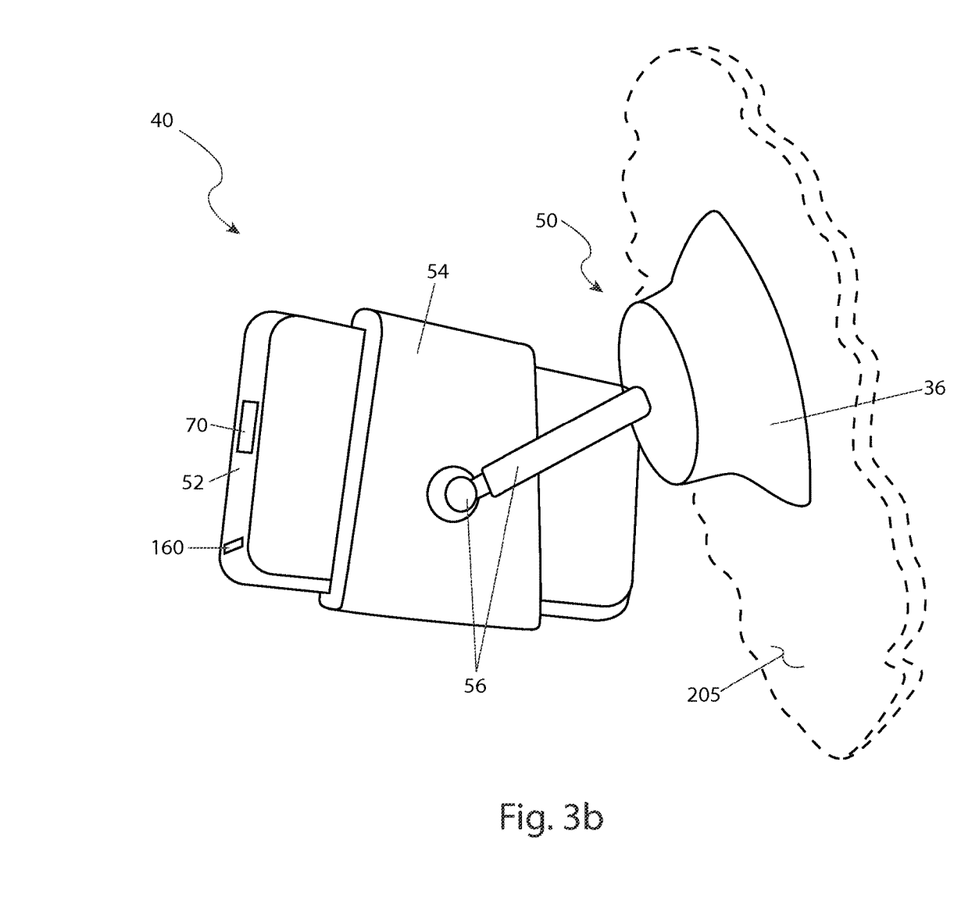
FIG. 3b is a rear view of the wireless monitor 40, according to a preferred embodiment of the present invention; and, FIG. 3c is a schematic of the wireless monitor 40, according to a preferred embodiment of the present invention.
Figure 3C:
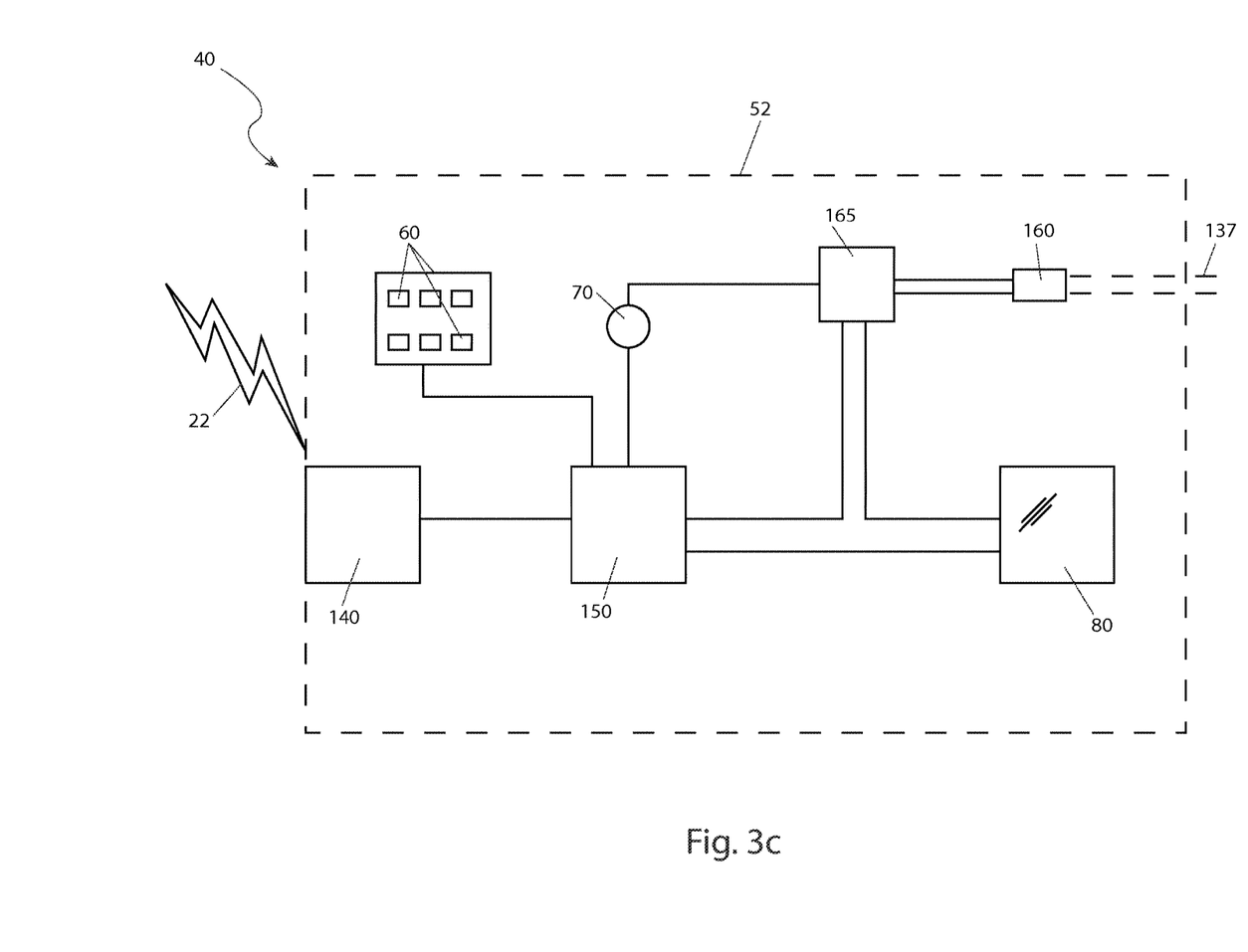

Referring now to FIGS. 3a, 3b and 3c, front, rear, and schematic views of the wireless monitor 40, according to a preferred embodiment of the present invention, are disclosed. The data representing the video/audio feed from the video camera 20 is transmitted to the wireless monitor 40 which in turn provides video and audio communication to a user via respective display screen 80 and at least one (1) speaker 70 portions.

The wireless monitor 40 is envisioned to be a commercially-available personal electronic device, shown here in the form of a Smartphone; however, it is understood that similar devices may be used with equal benefit such as an IPAD®, SAMSUNG GALAXY NOTE®, BLACKBERRY®, and the like, without deviating from the teachings of the invention, and as such should not be interpreted as a limitation of scope.

The wireless monitor 40 is to be capable of receiving video and audio data from a plurality of video cameras 20. The central processor portion 150 of the wireless monitor 40 is envisioned to provide software applications (apps) enabling receiving of radio signals 22 and enabling such features as a split display screen 80 to facilitate displaying video feeds from two (2) or more video cameras 20 simultaneously. The wireless monitor 40 is envisioned to include conventional and expected functions including, but not limited to: push buttons 60, a speaker 70, a display screen 80, a radio receiver 140, a central processor 150, and a second electrical power supply receptacle 160.

The push buttons 60 provide a means of user input and a means to select functions such as video zoom, audio volume control, split screen display, and the like. The push buttons 60 also afford the user the ability to switch between multiple video feeds and between sound feeds from multiple video cameras 20 based upon different video and audio equipment configurations. The push buttons 60 is illustrated here as a row of discrete push buttons; however, the push buttons 60 may take on various forms which enable human interface such as a matrix type keypad, a plurality of virtual push buttons upon a touch screen display, or the like.

The display screen 80 is envisioned to utilize various display technologies such as, but not limited to: a liquid crystal display (LCD), a touch screen, or other current display technologies.

The second electrical power supply receptacle 160 enables the wireless monitor 40 to receive electric power from an electrical power source 137 for internal distribution to the electrical components. In a preferred embodiment, the second electrical power supply receptacle 160 is envisioned to be a USB connection or equivalent means, capable of conducting electrical power from the remote power source 137 to a rechargeable second battery 165 within the wireless monitor 40. The wireless monitor 40 then provides distribution of electrical power from the second battery 165 to the aforementioned electrical components. It is understood that the remote power source 137 may include a cigarette lighter socket, a plug-type AC/DC transformer, or the like based upon particular applications of the system 10, electrical power availability, and a user's preference.

It is understood that the wireless monitor 40 may be utilized in a hand-held manner if desired; however, it is envisioned to be advantageous in certain applications to utilize a third attachment mechanism 50 which provides a means to mount the wireless monitor 40 in a hands-free manner. The third attachment mechanism 50 includes at least one (1) suction cup 36, a monitor bracket 54, and a pivot assembly 56. The suction cup 36 is to be affixed to a flat surface such as a windshield, and includes an integral pivot assembly 56 which in turn protrudes rearwardly from the suction cup 36. The pivot assembly 56 is pivotingly and orbitally engaged with the monitor bracket 54, thereby providing orbitally adjustable positioning of the monitor bracket 54 and the removably attached wireless monitor 40. A particular embodiment of the monitor bracket 54 is illustrated here having a "C"-shaped clamping design, capable of being snapped onto opposing edge portions of a monitor housing portion 52 of the wireless monitor 40; however, it is understood that various designs of the monitor bracket 54 may be introduced for attachment to variously sized personal electronic devices, without deviating from the teachings of the system 10, and as such should not be interpreted as a limitation of scope.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of installing and utilizing the system 10 may be achieved by performing the following steps: acquiring a model of the system 10 configured with particular attachment mechanisms 30a, 30b, 50 suitable to a particular wireless monitor 40 and application of the system 10; charging the first battery portion 135 within the video camera 20 by connecting the first electrical supply receptacle 130 to a power source 137 until the first battery 135 is properly charged; charging the second battery portion 165 within the wireless monitor 40 by connecting the second electrical supply receptacle 160 to a power source 137 until the second battery 165 is properly charged; installing the video camera 20 within the area to be monitored by mounting the video camera 20 to an object such as a headrest portion of a vehicle 200, or similar appendage, using the first attachment mechanism 30a; wrapping the strap portions of the first attachment mechanism 30a around the headrest and securing by joining the hook-and-loop fasteners 32, or; using the second attachment mechanism 30b to mount the video camera 20 to a smooth surface such as a window using the suction cup portion 36; installing the wireless monitor 40 using the third attachment mechanism 50 or equivalent means, to a structure within an area in which the user intends to observe the monitored area; positioning the power switch portion 133 of the video camera 20 to the "on" position; activating the wireless monitor 40 in a normal fashion, if not previously activated; allowing the video camera 20 to record and transmit motion picture and audio data from the monitored area to the wireless monitor 40 via radio signals 22 for video display upon the display screen 80 and audio broadcasting from the speaker 70; using the push button portions 60 of the wireless monitor 40 to provide software prompted inputs and for selecting various functions, such as video zoom, audio volume control, split screen display, and the like; and, visually and acoustically monitoring a remote, or otherwise obstructed area, afforded a user of the present invention 10.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

The invention claimed is:

1. A monitoring system, comprising:
a wireless audio-video camera producing an audio-visual feed, said audio-video camera, comprising:
   a camera housing having a lens;
   a sensor enclosed within said camera housing and operable to detect audio content and visual content of said audio-visual feed;
   a camera processor located within said camera housing and operable to process said audio content and said visual content;
   a radio transmitter located within said camera housing and operable to wirelessly transmit said audio-visual feed;
   a first bracket attached to a right side of said camera housing;
   a second bracket attached to a left side of said camera housing aligned with and opposite to said first bracket;
   a first strap attached to said first bracket;
   a second strap attached to said second bracket, wherein said first strap and said second strap are releasably connected together for removably connecting said wireless audio-video camera to a first ancillary structure;
   a first suction cup attached to a back side of said camera housing for alternatively removably connecting said wireless audio-video camera to said first ancillary structure; and
a wireless monitor displaying said audio-visual feed, said wireless monitor, comprising:
   a monitor housing;
   a radio receiver located within said monitor housing and operable to wirelessly receive said audio-visual feed;
   a speaker attached to said monitor housing and operable to reproduce said audio content of said audio-visual feed;
   a display attached to said monitor housing and operable to display said visual content of said audio-visual feed; and,
   a second suction cup attached to said monitor housing for removably affixing connecting said wireless monitor to a second ancillary structure, spaced away from said first ancillary structure, said wireless monitor further comprises a monitor bracket attached to said second suction cup, and wherein said monitor bracket is removably connected to said monitor housing, said wireless monitor further comprises a pivot assembly interconnecting said monitor bracket and said second suction cup and operable to adjust a position of said monitor bracket relative to said suction cup for adjusting a viewing angle of said display;
wherein said first strap and said second strap each comprises a complementary portion of a hook-and-loop fastener disposed on a distal end thereof;
wherein said first strap and said second strap are wrapped about said first ancillary structure and to removably secure said wireless audio-video camera to said first ancillary structure;
wherein said display is a liquid crystal display; and,
wherein said wireless monitor is a mobile electronic device.

* * * * *